United States Patent

Barthel et al.

[11] Patent Number: 5,579,220
[45] Date of Patent: Nov. 26, 1996

[54] METHOD OF UPDATING A SUPPLEMENTARY AUTOMATION SYSTEM

[75] Inventors: Herbert Barthel, Herzogenaurach; Horst Daar, Erlangen; Hartmut Schuetz, Heroldsbach, all of Germany

[73] Assignee: Siemens Aktiengesellschaft, München, Germany

[21] Appl. No.: 281,373

[22] Filed: Jul. 27, 1994

[30] Foreign Application Priority Data

Jul. 28, 1993 [DE] Germany .............................. 4325326.1

[51] Int. Cl.⁶ ...................................... G05B 9/02
[52] U.S. Cl. ...................... 364/187; 364/184; 364/131; 395/181
[58] Field of Search ...................... 364/131, 184, 364/187; 371/4, 9.1, 53; 395/182.04, 182.11, 182.13, 488, 183.1, 183.11, 183.17

[56] References Cited

U.S. PATENT DOCUMENTS

| 3,636,331 | 1/1972 | Amrehn | 364/187 |
| 4,141,066 | 2/1979 | Keiles | 364/187 |
| 4,872,106 | 3/1989 | Keine | 395/182.11 |
| 5,088,021 | 2/1992 | McLaughlin | 364/187 |
| 5,155,837 | 10/1992 | Liu et al. | 395/500 |

FOREIGN PATENT DOCUMENTS

| 0460308 | 11/1991 | European Pat. Off. . |
| 0460307 | 11/1991 | European Pat. Off. . |

OTHER PUBLICATIONS etz-a, vol. 99, 1978, No. 5, pp. 260–266, Manfred Eichler: *Parallel-arbeitendes Doppelrechnersystem—eine ausfallsicheres Rechnerkonzept.*

Primary Examiner—Paul P. Gordon
Attorney, Agent, or Firm—Kenyon & Kenyon

[57] ABSTRACT

An update method is described for a supplementary automation system, which is to be coupled to a starting automation system, where the starting automation system controls a technical system. In the present invention, updating takes place free of update-interruption as opposed to interrupting program execution by the starting automation system, performing the updating and resuming program execution by both automation systems. In one embodiment, a non-time-critical system state is awaited and then updating is performed. In a second embodiment, the updating is interspersed in small time slices into the program execution.

13 Claims, 2 Drawing Sheets

METHOD OF UPDATING A SUPPLEMENTARY AUTOMATION SYSTEM

BACKGROUND OF THE INVENTION

The present invention relates to a method for updating a supplementary automation system, which is coupled to an automation system comprising at least one starting automation system and controlling a technical process or a technical system through an executed program.

Redundant automation systems are in widespread use. These automation systems are mostly singly or doubly redundant, that is, two or three automation systems are used to control one and the same technical process or one and the same technical system. In a configuration of this type a subsystem occasionally fails, and the technical system or the technical process is controlled by the remaining subsystem (starting automation system) or rather the remaining subsystems. Following the exchange or the repair of the failed subsystem, this subsystem must be recoupled to at least one starting automation system. Until now, one way of handling this required the following steps: 1) the starting automation system momentarily controlling the technical system interrupts program execution; 2) the necessary operating data are transferred from the starting automation system to the supplementary automation system, and thereupon the starting automation system; and 3) the supplementary automation system resumes program execution and, thus, jointly takes control of the technical system.

This procedure is not optimal in that during the updating step, control over the technical system is not guaranteed. Under certain circumstances, it can even be difficult, dangerous and time-consuming to bring down a system and restart it at a later time.

Accordingly, an object of the present invention is to provide an update method in which the aforementioned disadvantages are prevented from occurring.

SUMMARY OF THE INVENTION

This and other objectives are met by the method of the present invention which operates the technical system free of update-interruption.

It is possible using the method of the present invention, for example, by waiting for a non-time-critical state of the technical process or the technical system, the updating then takes place completely during this non-time-critical state.

It is also possible for the updating to occur in time portions which are inserted into the program execution of the starting automation system.

DETAILED DESCRIPTION

Figure 1:
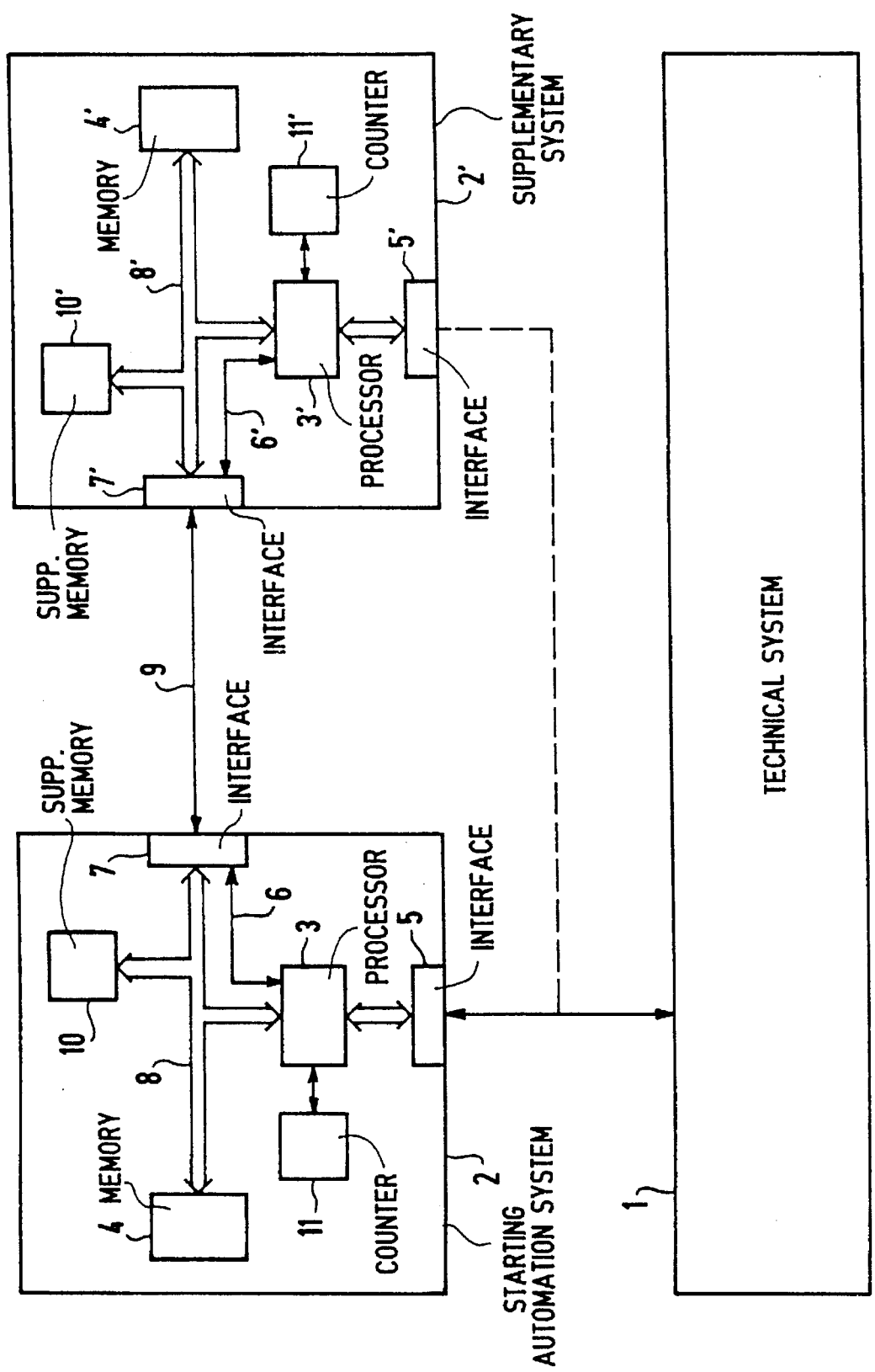
FIG. 1 is a block diagram of an automation system which uses the method of the present invention.

Referring to FIG. 1, a technical system 1, is shown only schematically, in which a technical process is running. The technical system 1 is controlled by the starting automation system 2. The automation system 2 will be referred to hereafter as the starting system. Likewise, the automation system 2' is designated as the supplementary system.

To control the technical system 1, the starting system 2 has a processor 3, which executes a program to control the technical system 1, this program is stored in working memory 4. The control of the technical system 1 takes place via the systems interface 5.

The supplementary system 2' comprises essentially the identical components: a processor 3', a working memory 4' and systems interface 5'.

In the present case, it is assumed that the starting system 2 exclusively controls the technical system 1 and that the supplementary system 2' is coupled to the starting system 2 to immediately take over control of the technical system 1 if the starting system 2 fails. For this purpose, not only must the program in working memory 4' be identical to the program in working memory 4, but the process data in the two automation systems 2, 2' must also agree.

To achieve this agreement of process data, free of update-interruption, the update time required to carry out the updating of the supplementary system 2' is stored in working memory 4, according to an exemplified embodiment of the present invention. This update time is naturally dependent on the amount of data to be updated and the efficiency of communications between the automation systems 2, 2'.

Moreover, the data configurations of non-time-critical states and the accompanying time durations during which the reaction to process changes is non-time-critical are specified to the starting system 2. Therefore, the starting system 2 can compare the momentary process data with the data configurations of non-time-critical states and recognize non-time-critical states. When such a state is recognized, the accompanying time duration during which the reaction to state changes is non-time-critical is compared with the update time. If the duration of the non-time-critical state exceeds the update time, the processor 3 activates the communications interface 7 via the control line 6. The communications interface 7 then calls up the data to be updated from working memory 4 via the bus 8 and transfers the data via the communications line 9 to the communications interface 7' of the supplementary system 2'. This system, in turn, stores the data in working memory 4' and signals the end of the update procedure to the processor 3'. From this point on, both automation systems 2, 2' are capable of immediately taking control of the technical system (this is known as "hot stand-by" mode).

Figure 2:
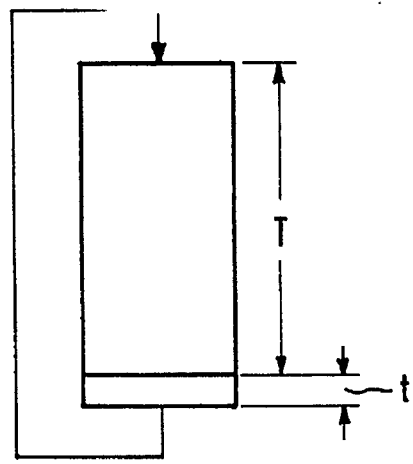
FIG. 2 shows the principle of interspersing time slices into the program execution of the starting automation system.

The above method is optimal if a non-time-critical state of the technical system exists, the duration of which exceeds the update time. If, on the other hand, no such state exists, the updating must take place in time slices which are cyclically inserted into the program execution. In this context, it is noted that program execution generally takes place cyclically in automation devices (as seen in FIG. 2). The program cycle time is designated as T in FIG. 2. At the end of the program cycle, the program supplementary system 2' is now updated gradually in small time slices having a temporal duration. The resulting increase in program cycle time T is negligible. Instead of inserting only one time slice per time cycle, it is naturally also possible to insert multiple time slices per program cycle. The number of time slices is calculated to correspond to at least one complete update pass.

Figure 3:
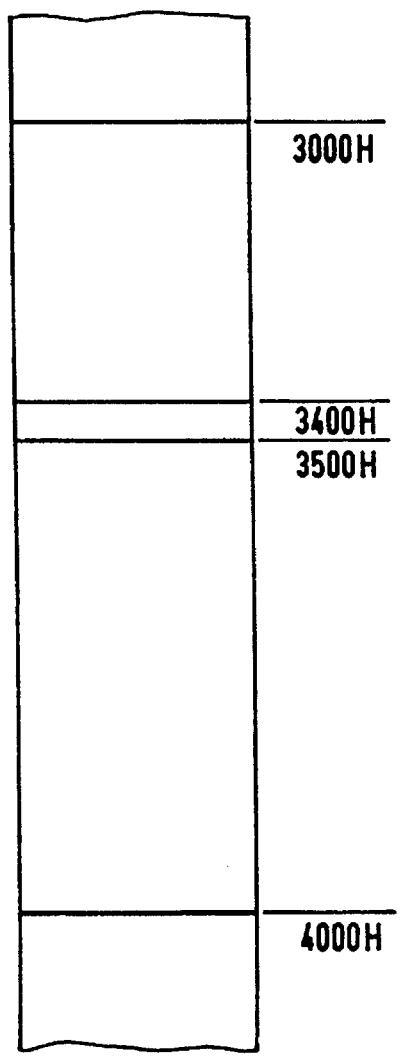
FIG. 3 shows a section of the memory allocation of the subsystems of the automation system of FIG. 1.

As shown in FIG. 3, the data to be updated encompass a memory range having a starting address of 3000H (H=hexadecimal) and an ending address of 4000H. During one time slice, a memory range of 100H is transferred in each case from the starting system 2 to the supplementary system 2' (e.g., the memory range from 3400H to 3500H). In the next time slice, either the memory range from 3300H to 3400H (for decreasing address processing) or from 3500H to 3600H (for increasing address processing) is transferred.

During each program cycle, the starting system 2 reads input signals from the technical system and outputs output signals to the technical system 1 at least once. In contrast, the supplementary system 2' may not, of course, execute the program nor perform write peripheral accesses during the updating period. Only read peripheral accesses are allowed. The co-execution of read peripheral accesses is actually advantageous since the supplementary system 2' is necessarily co-updated in so doing.

If the input signals were the only signals with changing values, the memory range to be updated would have to be transferred from the starting system 2 to the supplementary system 2' only once; otherwise, the supplementary system 2' would also read in the input signals from the technical system 1. However, other signals do change, such as the counter and timer values as well as the output signals. Before the update procedure can be considered completed, the equality of these data must also be ensured. For this purpose, two alternatives are provided by the present invention. If the communications interfaces 7, 7' and the communications line 9 are efficient, the following method can be performed advantageously.

A transfer address is initially set equal to the starting address (i.e., 3000H in the present example). When the first time slice is reached, the first 100H bytes are transferred from the starting system 2 to the supplementary system 2'. The transfer address is then incremented by the amount of data transferred (i.e., to 3100H in the present case). During the following cycle (i.e., during the time interval until the next time slice is reached) all write accesses which the starting system 2 executes in the memory range from 3000H to 3100H are recorded. They are immediately reported via the communications interface 7 to the communications interface 7', which stores the addresses and values of the newly written data in supplementary memory 10'. In this case, the supplementary memory 10' is configured as a cyclic buffer. The processor 3' is thus able to immediately read out the cyclic buffer 10' and update the already updated memory range of working memory 4' or keep this memory range up to date.

When the next time slice is reached, the next 100H bytes, having addresses from 3100H to 3200H, are transferred in accordance with the above example. The transfer address is then set equal to 3200H. During the next cycle, all write accesses to the memory range from 3000H to 3200H are immediately reported to the supplementary system 2' so that once again, the already updated memory range can be kept up to date.

This transferring of data, incrementing of the transfer address, and updating of the already updated memory range are repeated until the transfer address reaches the value 4000H. Then, the update procedure is finished and the supplementary system 2' can switch over to hot stand-by mode.

If very many changes occur in the already updated data ranges during the updating period, the communications facilities linking the automation systems 2, 2' might possibly be unable to keep the already updated memory range up to date. In this case, the starting system is forced to interrupt its operations and updating cannot take place entirely free of update-interruption. However, in the great majority of cases, the method can be carried out without an interruption in program execution.

If efficient communications facilities are not available to link the automation systems 2, 2', the updating method is preferably performed as follows.

As in the example described above, 100H bytes are transferred in each case from the starting system 2 to the supplementary system 2'. There, they are initially stored in the supplementary memory 10'. The data written into the supplementary memory 10' are compared with the corresponding data in the working memory 4' during the program cycle between two time slices and then written into working memory 4'. In doing this, the processor 3' determines if the data are equal. If they are equal, the value of counter 11' is incremented by one. Otherwise, the counter 11' is set to zero.

The update passes thus take place, if necessary, alternately with increasing and with decreasing address processing. The updating is considered executed if, during a given number of successive time slices, all comparison operations, between the transferred data and the data already in working memory 4 result in equal values.

If the updating is considered executed, a check value is computed when the next time slice is reached for the data to be updated or already updated in both automation systems 2, 2'. The check value can be a checksum or a signature, for example. The calculated checksums are exchanged via the communications interfaces 7, 7' and compared with one another. If the check values are equal, the updating is considered terminated. Otherwise, the counter 11' is set to zero and a new update procedure is carried out.

What is claimed is:

1. A method of updating a supplemental automation system comprising:

controlling a technical system with at least one starting automation system, said starting automation system comprising an executed program which includes a plurality of data used in controlling said technical system;

updating said data in a supplementary automation system coupled to said starting automation system and said technical system, said updating occurring without interrupting control of said technical system by said starting automation system and wherein said updating step occurs entirely during a non-time-critical state of said technical system;

specifying data configurations in said starting automation system which indicate non-time-critical states of said technical system, such that said starting automation system is capable of recognizing non-time-critical states in said technical system: and specifying an update time in said starting automation system, such that said update time is an amount of time required to completely perform said updating step in said supplementary automation system, such that said starting automation system is capable of recognizing whether a time duration of said non-time-critical state exceeds said update time.

2. A method of updating a supplemental automation system comprising:

controlling a technical system with at least one starting automation system, said starting automation system comprising an executed program which includes a plurality of data used in controlling said technical system; and updating said data in a supplementary automation system coupled to said starting automation system and said technical system, said updating occurring without interrupting control of said technical system by said starting automation system and wherein said updating step takes place in time slices inserted into said program execution of said starting automation system;

reading input signals in said starting automation system from said technical system during said updating step; and transmitting output signals from said starting automation system to said technical system, such that said supplementary automation system executes only read peripheral accesses during said updating step.

3. The method of claim 2 wherein data supplied by said starting automation system during said updating step is stored in said supplementary automation system between successive time slices.

4. The method of claim 2, wherein said data to be updated in said starting automation system is stored in a memory range having a starting address and an ending address, said method further comprising:

setting a transfer address in said starting automation system equal to said starting address;
- (a) transferring a quantity of the data stored between said transfer address and a next transfer address between said transfer address and said ending address to said supplementary automation system during said time slice;
- (b) setting the transfer address equal to said next transfer address after said quantity of data is transferred from said starting automation system to said supplementary automation system;
- (c) recording in said starting automation system all write accesses to a memory range between the starting address through the transfer address during a time between said time slices;
- (d) reporting said write accesses to said supplementary automation system during a time between said time slices, such that said supplementary automation system is capable of updating memory that has been previously updated; and
- (e) repeating steps (a) through (d) until said transfer address equals said ending address.

5. The method of claim 4, wherein said executed program is executed cyclically and that only one of said time slices is inserted into said executed program for each program cycle.

6. A method of updating a supplemental automation system comprising:

controlling a technical system with at least one starting automation system, said starting automation system comprising an executed program which includes a plurality of data used in controlling said technical system; and updating said data in a supplementary automation system coupled to said starting automation system and said technical system, said updating occurring without interrupting control of said technical system by said starting automation system and wherein said updating step takes place in time slices inserted into said program execution of said starting automation system; and comparing the data supplied by said starting automation system with the data stored in said supplementary automation system prior to storing said data in said supplementary automation system, such that said updating step is complete if during a preselected number of successive time slices all data supplied by said starting automation system is equal to the data stored in said supplementary automation system.

7. The method of claim 6, wherein after said updating step, said method further comprising:

computing a first check value in said starting automation system for said data supplied to said supplementary automation system during said updating step; and computing a second check value in said supplementary automation system for said data stored in said supplementary automation system during said updating step, such that said updating step is complete if said first and second check values are equal.

8. The method of claim 6 wherein data supplied by said starting automation system during said updating step is stored in said supplementary automation system between successive time slices.

9. The method of claim 7 wherein data supplied by said starting automation system during said updating step is stored in said supplementary automation system between successive time slices.

10. A method of updating a supplemental automation system comprising:

controlling a technical system with at least one starting automation system, said starting automation system comprising an executed program which includes a plurality of data used in controlling said technical system; and updating said data in a supplementary automation system coupled to said starting automation system and said technical system, said updating occurring without interrupting control of said technical system by said starting automation system and wherein said updating step takes place in time slices inserted into said program execution of said starting automation system and wherein said data to be updated in said starting automation system is stored in a memory range having a starting address and an ending address;

setting a transfer address in said starting automation system equal to said starting address;
- (a) transferring a quantity of the data stored between said transfer address and a next transfer address between said transfer address and said ending address to said supplementary automation system during said time slice;
- (b) setting the transfer address equal to said next transfer address after said quantity of data is transferred from said starting automation system to said supplementary automation system;
- (c) recording in said starting automation system all write accesses to a memory range between the starting address through the transfer address during a time between said time slices;
- (d) reporting said write accesses to said supplementary automation system during a time between said time slices, such that said supplementary automation system is capable of updating memory that has been previously updated; and
- (e) repeating steps (a) through (d) until said transfer address equals said ending address.

11. The method of claim 10, wherein said executed program is executed cyclically and that only one of said time slices is inserted into said executed program for each program cycle.

12. A method of updating a supplemental automation system comprising:

controlling a technical system with at least one starting automation system, said starting automation system comprising an executed program which includes a plurality of data used in controlling said technical system; and updating said data in a supplementary automation system coupled to said starting automation system and said technical system, said updating occurring without interrupting control of said technical system by said starting automation system and wherein said updating step takes place in time slices which are cyclically inserted into said program execution of said starting automation system and wherein said data to be updated in said starting automation system is stored in a memory range having a starting address and an ending address;

setting a transfer address in said starting automation system equal to said starting address;

(a) transferring a quantity of the data stored between said transfer address and a next transfer address between said transfer address and said ending address to said supplementary automation system during said time slice;

(b) setting the transfer address equal to said next transfer address after said quantity of data is transferred from said starting automation system to said supplementary automation system;

(c) recording in said starting automation system all write accesses to a memory range between the starting address through the transfer address during a time between said time slices;

(d) reporting said write accesses to said supplementary automation system during a time between said time slices, such that said supplementary automation system is capable of updating memory that has been previously updated; and (e) repeating steps (a) through (d) until said transfer address equals said ending address.

13. The method of claim 12, wherein said executed program is executed cyclically and that only one of said time slices is inserted into said executed program for each program cycle.

* * * * *